US011809331B1

(12) United States Patent
Mani et al.

(10) Patent No.: US 11,809,331 B1
(45) Date of Patent: Nov. 7, 2023

(54) STORAGE SYSTEM AND METHOD FOR AVOIDING HEADER TO IMPROVE PARITY

(71) Applicant: Western Digital Technologies, Inc., San Jose, CA (US)

(72) Inventors: Arunkumar Mani, Karnataka (IN); Lakshmi Sowjanya Sunkavelli, Karnataka (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/824,066

(22) Filed: May 25, 2022

(51) Int. Cl.
*G06F 12/1027* (2016.01)

(52) U.S. Cl.
CPC .............................. *G06F 12/1027* (2013.01)

(58) Field of Classification Search
None
See application file for complete search history.

(56) References Cited

U.S. PATENT DOCUMENTS

| | | | | |
|---|---|---|---|---|
| 2014/0208004 A1* | 7/2014 | Cohen | ................ | G06F 12/0246 711/103 |
| 2015/0074487 A1* | 3/2015 | Patapoutian | ........ | G06F 11/1012 714/758 |
| 2015/0324283 A1* | 11/2015 | Lai | ......................... | G11C 29/52 714/764 |
| 2017/0031612 A1* | 2/2017 | Ravimohan | ............ | G06F 3/065 |
| 2019/0026045 A1* | 1/2019 | Lin | ..................... | G06F 11/1048 |
| 2021/0089394 A1* | 3/2021 | Yu | ........................ | G06F 11/1068 |
| 2022/0317909 A1* | 10/2022 | Gunda | ................... | G06F 3/0619 |

* cited by examiner

*Primary Examiner* — Stephanie Wu
(74) *Attorney, Agent, or Firm* — Crowell & Moring LLP

(57) ABSTRACT

A storage system stores data in a primary block and a copy of the data in a secondary block. Parity bits are stored with the data and the copy of the data. A header with logical block information is stored with the copy of the data in the secondary block. The data in the primary block is not stored with a header, which allows more parity bits to be stored with the data in the primary block. This provides more robust error protection for the data stored in the primary block and reduces the need to rely upon the copy of the data in the secondary block.

16 Claims, 8 Drawing Sheets

STORAGE SYSTEM AND METHOD FOR AVOIDING HEADER TO IMPROVE PARITY

BACKGROUND

A host can send a write command to store data in a memory of a storage system. In some situations (e.g., when storing data received from a host in a single-level cell (SLC) block before later folding the data in a multi-level cell (MLC) block), a dual-write process is used to provide data reliability. In a dual-write process, data received from a host is stored in both a primary block of memory cells and a secondary block of memory cells. After the primary block is full, a write verification technique (e.g., an enhanced post-write-read (EPWR) operation) is performed to verify that the data stored in the primary block is the same as the data received from the host. If the write verifies successfully, the redundant data stored in the secondary block is released, leaving only one copy of the data (i.e., the data stored in the primary block) and leaving the secondary block available to store other data. However, if the write does not verify successfully (e.g., due to an error in one or more wordlines in the primary block), the data is still available in the secondary block.

DETAILED DESCRIPTION

The following embodiments generally relate to a storage system and method for avoiding header to improve parity. In one embodiment, a storage system is provided comprising a non-volatile memory and a controller. The controller is configured to store data in a first data word in a primary block in the non-volatile memory; and store a copy of the data in a second data word in a secondary block in the non-volatile memory. The first and second data words are a same size but comprise a different number of parity bits; the second data word comprises a header storing a logical address of the data; and instead of comprising the header, the first data word comprises more parity bits than the second data word.

In another embodiment, a method is provided that is performed in a storage system comprising a non-volatile memory. The method comprises: creating a first data word comprising data and parity bits; creating a second data word comprising the data, a header storing logical group information for the data, and parity bits, wherein there are fewer parity bits in the second data word than the first data word due to the header in the second data word; writing the first data word in a primary block in the non-volatile memory; and writing the second data word in a secondary block in the non-volatile memory.

In yet another embodiment, a storage system is provided comprising a non-volatile memory; means for storing data in a first data word in a primary block in the non-volatile memory; and means for storing a copy of the data in a second data word in a secondary block in the non-volatile memory; wherein: the first and second data words are a same size but comprise a different number of parity bits; the second data word comprises a header storing a logical address of the data; and instead of comprising the header, the first data word comprises more parity bits than the second data word.

Other embodiments are provided and can be used alone or in combination.

Figure 1A:
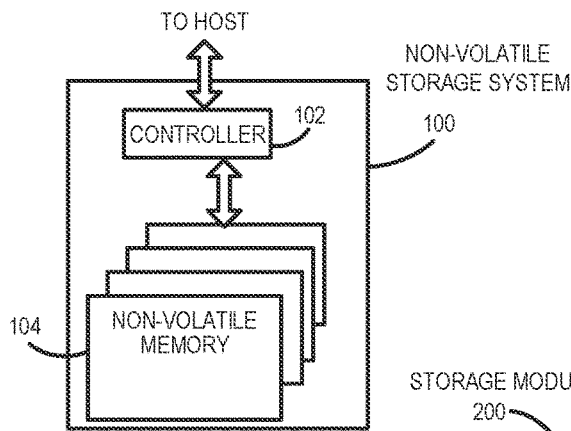
FIG. 1A is a block diagram of a non-volatile storage system of an embodiment.
Figure 1B:
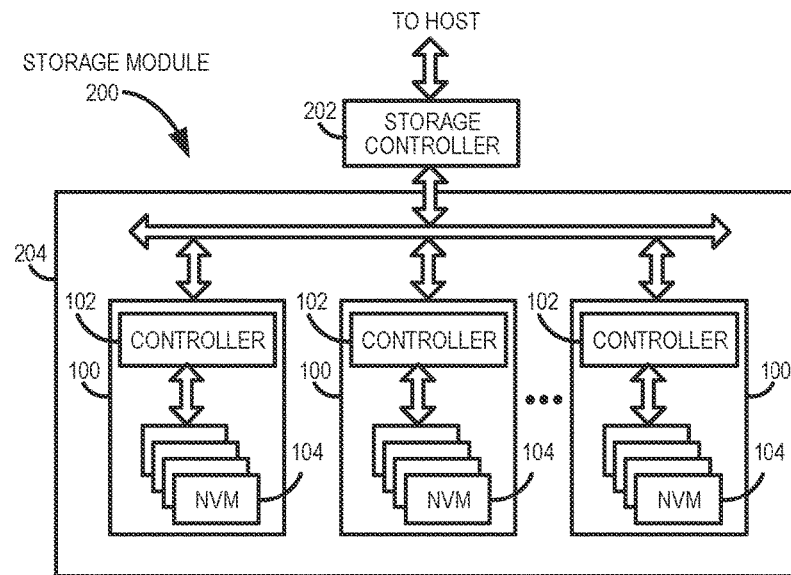
FIG. 1B is a block diagram illustrating a storage module of an embodiment.
Figure 1C:
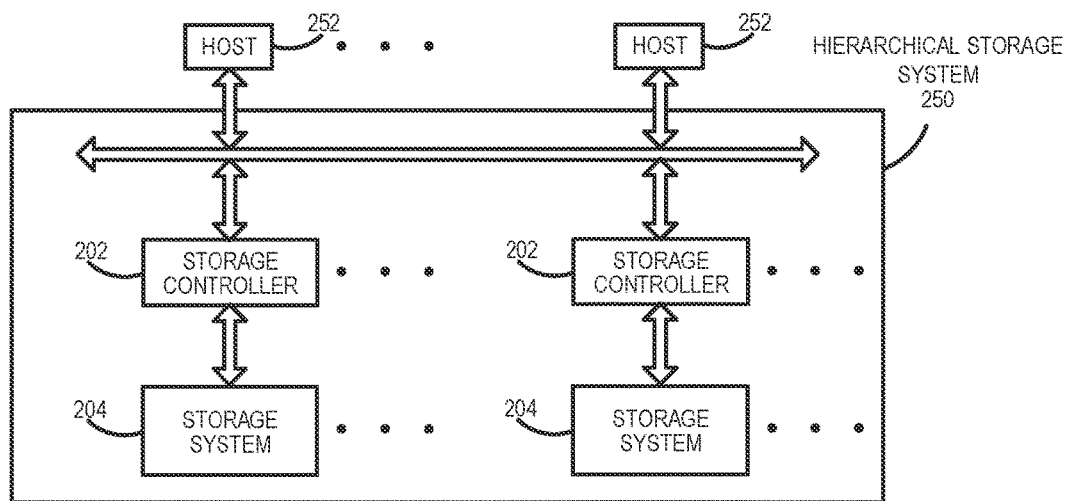
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magneto-resistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory cells that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including ReRAM, MRAM, PCM, NAND flash memory cells and/or NOR flash memory cells. The memory cells can take the form of solid-state (e.g., flash) memory cells and can be one-time programmable, few-time programmable, or many-time programmable. The memory cells can also be single-level (one-bit per cell) cells (SLC) or multiple-level cells (MLC), such as two-level cells, triple-level cells (TLC), quad-level cell (QLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card-based system, such as a secure digital (SD) or a micro secure digital (micro-SD) card (or USB, SSD, etc.). In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
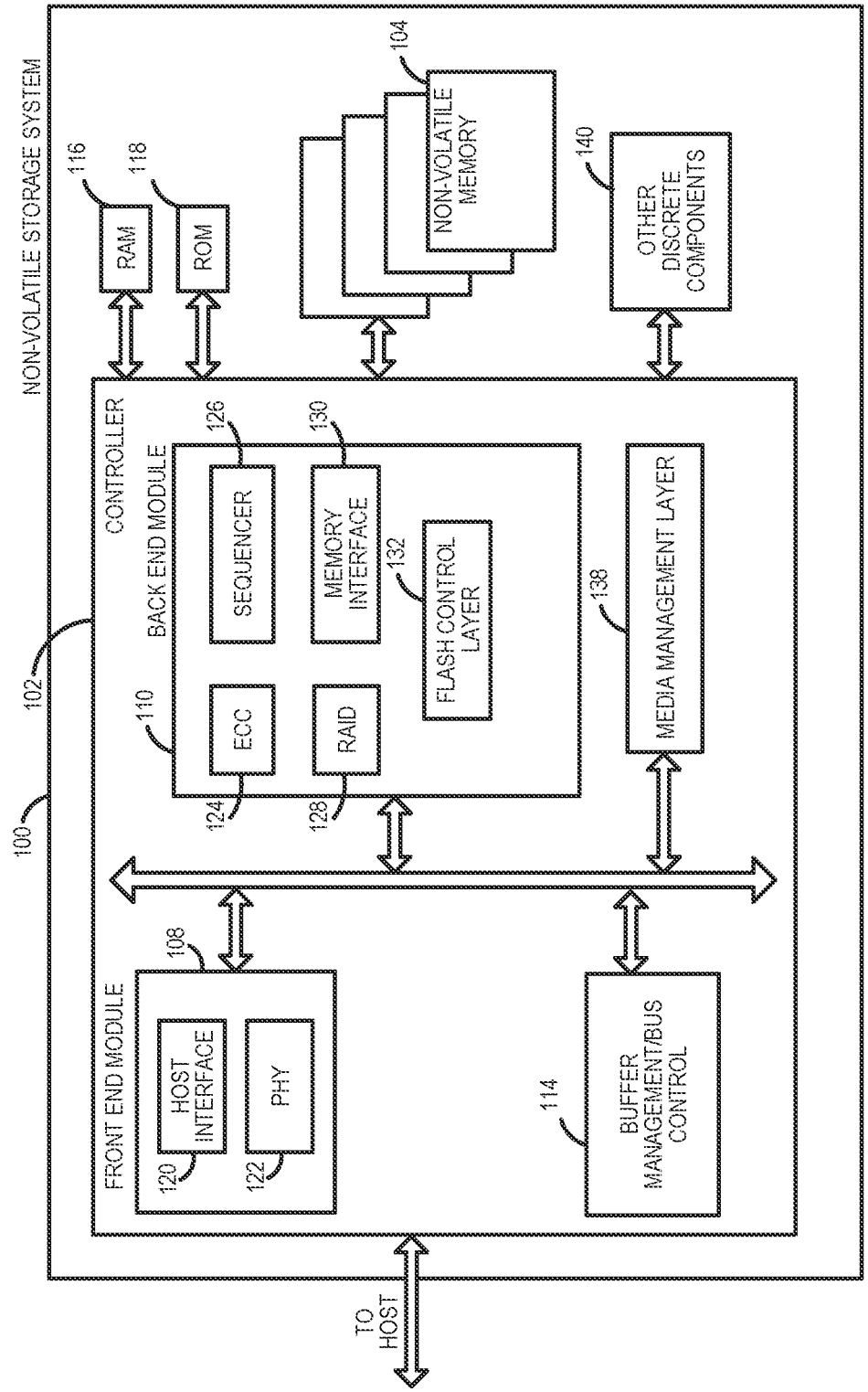
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR)

interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
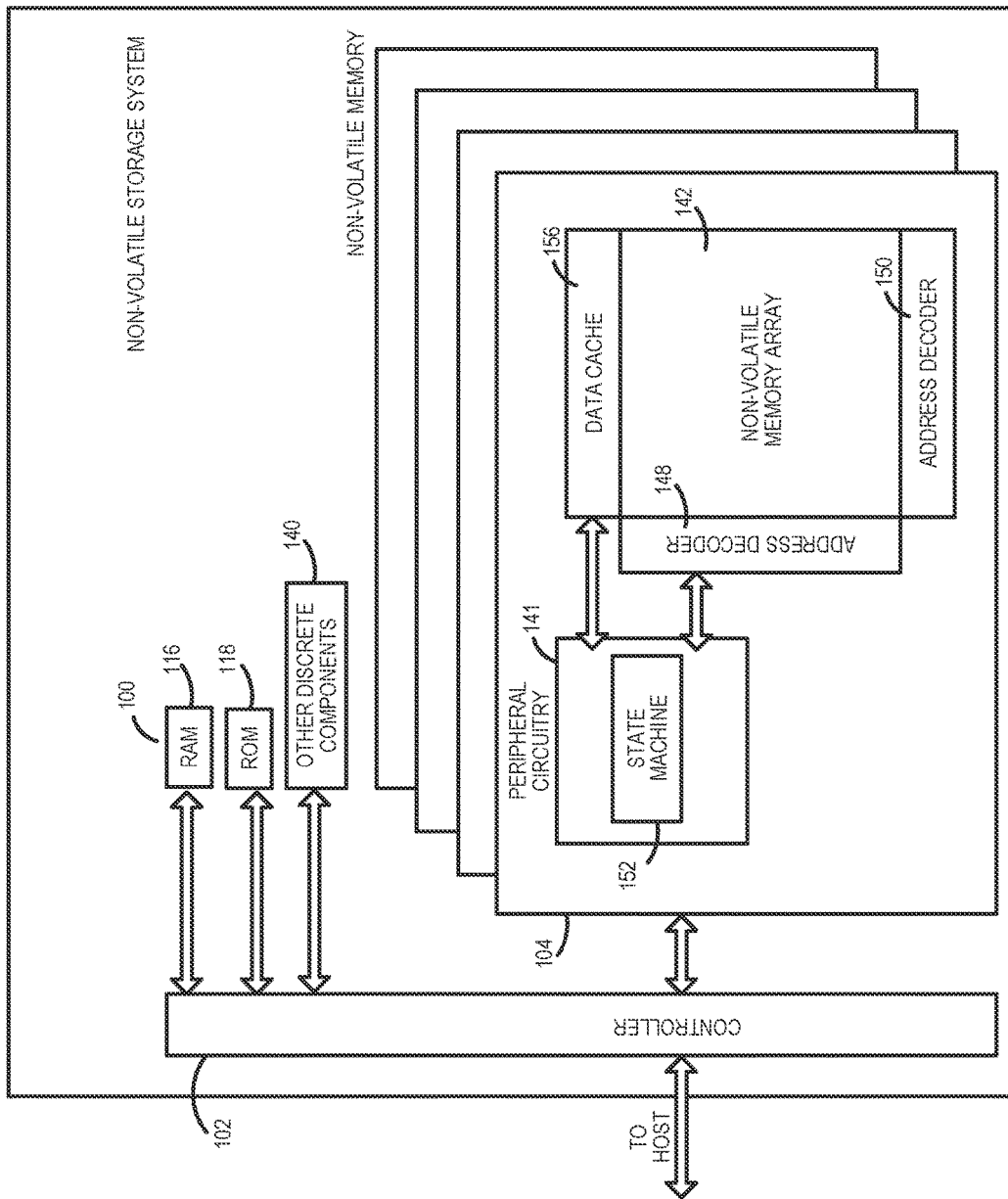
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block of memory cells. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
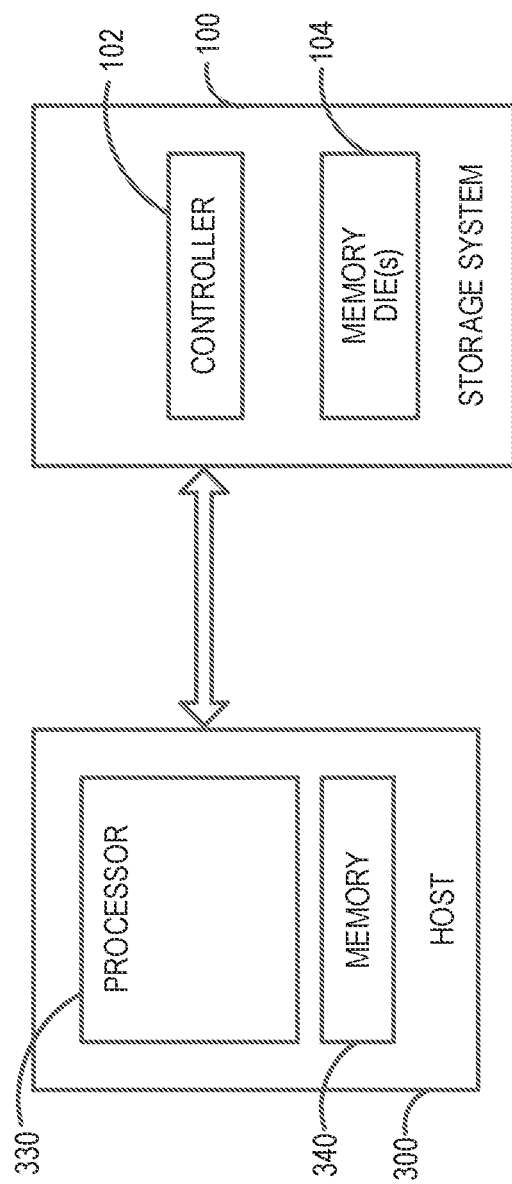
FIG. 3 is a block diagram of a host and storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340 (e.g., DRAM)) to the storage system 100 for storage in the storage system's memory 104 (e.g., non-volatile memory dies). While the host 300 and the storage system 100 are shown as separate boxes in FIG. 3, it should be noted that the storage system 100 can be integrated in the host 300, the storage system 100 can be removably connected to the host 300, and the storage system 100 and host 300 can communicate over a network. It should also be noted that the memory 104 can be integrated in the storage system 100 or removably connected to the storage system 100.

As mentioned above, in some situations (e.g., when storing data received from a host in a single-level cell (SLC) block before later folding the data in a multi-level cell (MLC) block), a dual-write process is used to provide data reliability. In a dual-write process, data received from a host is stored in both a primary block of memory cells and a secondary block of memory cells. The data can be stored in the secondary block in any suitable manner. For example, in one embodiment, data received from the host can be stored in a volatile memory cache or latches in the storage system then copied from the cache/latches to the primary block as one program operation, and then copied from the cache/latches to the secondary block as a separate program operation. In another embodiment, at least a portion of the primary and secondary blocks can be programmed in parallel.

After the primary block is full, a write verification technique (e.g., an enhanced post-write-read (EPWR) operation) is performed to verify that the data stored in the primary block is the same as the data received from the host. If the write verifies successfully, the redundant data stored in the secondary block is released, leaving only one copy of the data (i.e., the data stored in the primary block) and leaving the secondary block available to store other data. However, if the write does not verify successfully (e.g., due to an error in one or more wordlines in the primary block), the data is still available in the secondary block.

Figure 4:
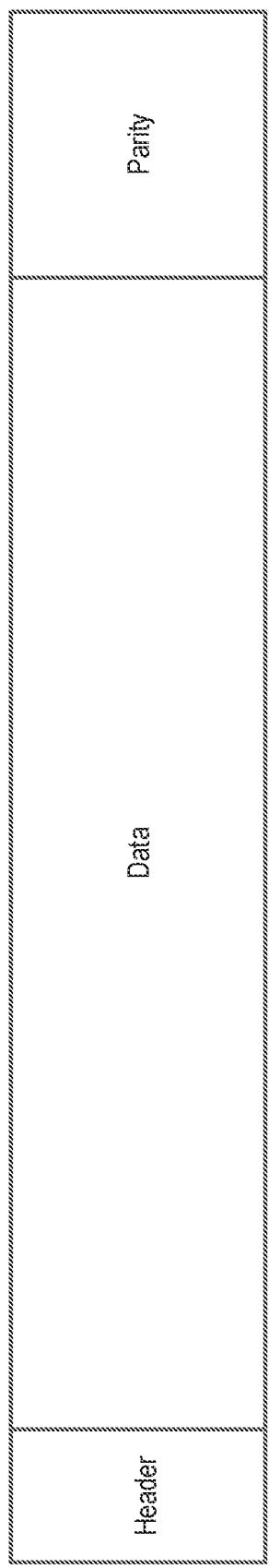
FIG. 4 is a diagram of a structure of data written to a memory of an embodiment.

As shown in FIG. 4, the data written to the primary and second blocks can be part of a structure (data word) that also contains a header and parity bits. The header contains a logical block address (provided by the host 300) at which the data should be stored (the header can contain other information). (The logical address can be part of logical group (LG) information.) The controller 102 of the storage system 100 uses a logical-to-physical address table to store as association between the logical block address and a physical address in the memory 104 where the data is stored. To make accessing the logical-to-physical address table faster, the logical-to-physical address table can be stored in volatile memory in the storage system 100 and/or host 300. At some point, updates made to the logical-to-physical address table are committed to the non-volatile memory 104. However, if there is a power cycle/loss before the updates are committed, the updates would need to be recreated by identifying that data is stored at a physical address in the non-volatile memory 104, reading the logical block address from the header of that data, and then re-writing the association between the logical block address and the physical address in the table. In this way, the header information can be used to regenerate the logical block address information after a power cycle.

The parity bits (e.g., error correction code (ECC) bits) can be generated by an ECC engine (e.g., in the controller 102) during an encoding process based on the data and other information in the data word. The parity bits can be later used to detect and possibly correct any errors in the data word in a decoding process after reading the data back from the memory 104.

Figure 5:
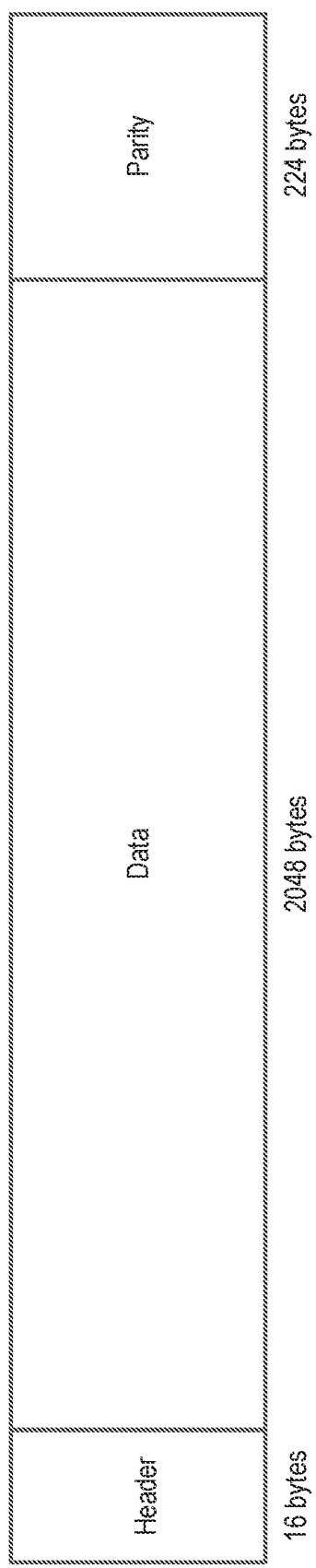
FIG. 5 is a diagram of a structure of data written to a memory of an embodiment.
Figure 6:
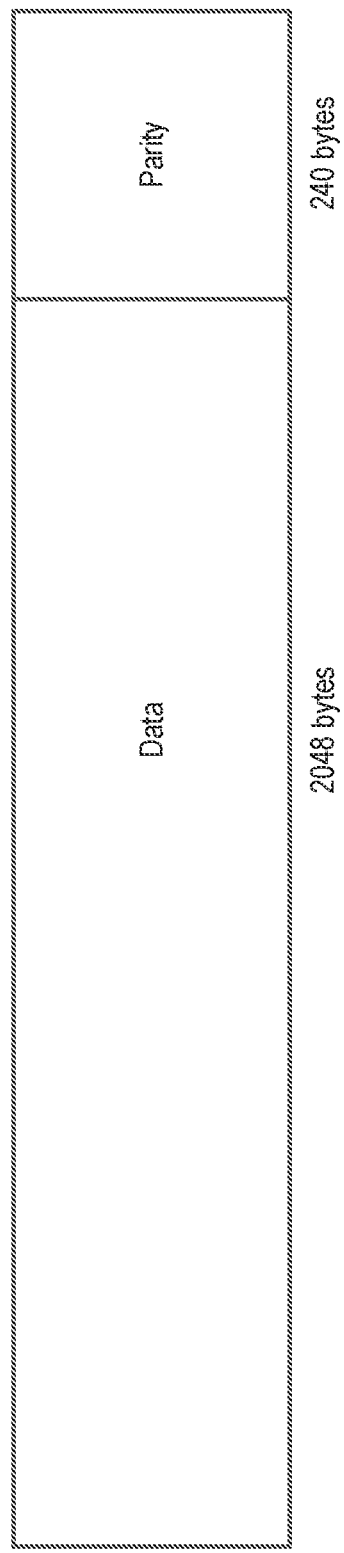
FIG. 6 is a diagram of a structure of data written to a memory of an embodiment.

This embodiment recognizes two aspects of the data structure in FIG. 4: (a) adding more parity bits would provide better error protection and (2) the bits reserved for the header take up space that can otherwise be used for extra parity bits. This is illustrated in FIGS. 5 and 6, where the data word is 2,292 bytes. In the example shown in FIG. 5, the 2,292 bytes have the following allocation: 16 bytes for the header, 2,048 bytes for user data, and 224 bytes for parity. In the example shown in FIG. 6, the number of bytes allocated for the user data is the same, but the header is eliminated, and its allocated space is used for extra parity bits for more protection. More specifically, the data word in FIG. 6 has 240 bytes of parity instead of the 224 bytes in the data word of FIG. 5 (the number of data bytes is the same at 2,048 bytes). However, because the data word in FIG. 6 does not have a header, the data word does not store the logical block information, which means the logical-to-physical address association cannot be discerned from the data word in an event of a power cycle.

To address this issue, the following embodiment takes a "hybrid" approach. Instead of storing identical copies of a data word in the primary and secondary blocks, two different data words are stored—one with more parity bits than the other. So, for example, the data word of FIG. 6 can be stored in the primary block, and the data word of FIG. 5 can be stored in the secondary block. This results in having more parity bits in the primary copy for better error correction because the header bits are removed, and that space is used for more parity bits.

There are several advantages associated with these embodiments. For example, by storing additional parity bits, the primary copy has more robust data protection, which effectively reduces the probability that the secondary copy will need to be used. In one implementation, as the number of parity bytes increase, low-density parity check (LDPC) correction capability increases, so more bit flips can be corrected. This will help the LDPC engine to correct the data, avoiding the complicated and time-consuming read-error handling (REH) process.

However, an issue may be encountered in a power cycle situation. As explained above, after the data is written in the primary and secondary blocks, the controller 102 creates an entry in a logical-to-physical address table in volatile memory (e.g., RAM). If a power cycle occurs before the logical-to-physical address table is stored in the non-volatile memory 104, the address translation information will be lost. Because the copy of the data word stored in the primary block does not contain header information, the logical address for the data word is not contained in the data in the primary block. However, the header with the logical information is stored in the header of the secondary block. So, in the evert of a power cycle situation, the header of the data word in the secondary block can be read to retrieve the logical block address to rebuild the logical-to-physical-address entry. This is illustrated in the flow chart 700 of FIG. 7.

Figure 7:
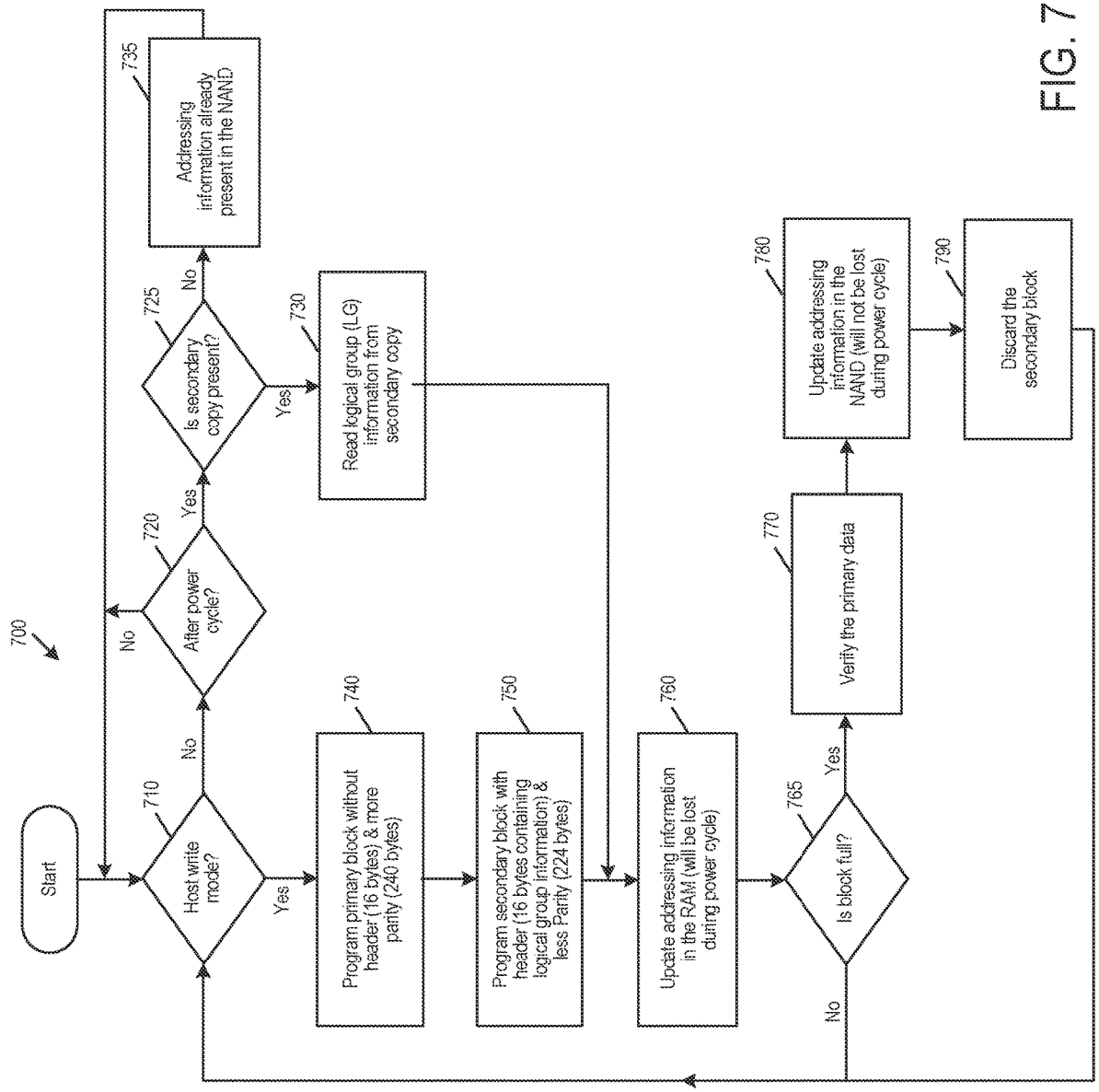
FIG. 7 is a flow chart of a method of an embodiment.

As shown in FIG. 7, the controller 102 first determines if the storage system 100 is in host write mode (act 710). If the storage system 100 is in host write mode, the controller 102 programs a primary block without a header and with more parity (act 740) and programs a secondary block with a header and with fewer parity bits (act 750). Then, the controller 102 updates addressing information in the volatile memory (e.g., RAM), which will be lost during a power cycle (act 760). Next, the controller 102 determines if the block is full (act 765). If the block is not full, the method loops back to act 710. If the block is full, the controller 102 verifies the data in the primary block (act 770), updates the addressing information in the non-volatile memory 104 (act 780), and discards the secondary block (act 790).

Referring back to act 710, if the storage system is not in host write mode, the controller 102 determines if there has been a power cycle (act 720). If there has not been a power cycle, the method loops back to act 710. However, if there has been a power cycle, the controller 102 determines if the secondary copy is present (act 725). If the secondary copy is not present, the address information is already present in the non-volatile memory 104 (act 735). However, if the secondary copy is present, the controller 102 reads the logical group (LG) information from the secondary copy (act 730) and loops to act 760, which was discussed above.

As seen by this example, the main data word is written in a primary block without a header, and the redundant data word is written in a secondary block with a header. This allows the primary block to have more parity than the secondary block. When there is a power cycle before data verification of the primary copy, the secondary copy can be used to regenerate the logical information after the power cycle. If a power cycle happened after data verification of the primary copy, an address table can be used to regenerate the logical information, which eliminates the need for the header in the primary copy.

Finally, as mentioned above, any suitable type of memory can be used. Semiconductor memory devices include volatile memory devices, such as dynamic random access memory ("DRAM") or static random access memory ("SRAM") devices, non-volatile memory devices, such as ReRAM, electrically erasable programmable read only memory ("EEPROM"), flash memory (which can also be considered a subset of EEPROM), ferroelectric random access memory ("FRAM"), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional (2D) memory structure or a three dimensional (3D) memory structure.

In a 2D memory structure, the semiconductor memory elements are arranged in a single plane or a single memory device level. Typically, in a 2D memory structure, memory elements are arranged in a plane (e.g., in an x-z direction plane) that extends substantially parallel to a major surface of a substrate that supports the memory elements. The substrate may be a wafer over or in which the layer of the memory elements is formed or it may be a carrier substrate that is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A 3D memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements in each column. The columns may be arranged in a 2D configuration, e.g., in an x-z plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the 2D and 3D structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:

1. A storage system comprising:
    a volatile memory;
    a non-volatile memory; and
    a controller coupled with the volatile memory and the non-volatile memory and configured to:
        store data in a first data word in a primary block in the non-volatile memory;
        store a copy of the data in a second data word in a secondary block in the non-volatile memory;
        wherein:
            the first and second data words are a same size but comprise a different number of parity bits;
            the second data word comprises a header storing a logical address of the data; and
            instead of comprising the header, the first data word comprises more parity bits than the second data word;
        store, in the volatile memory, an association between the logical address of the data and a physical address of the primary block;
        verify that the first data word was written correctly in the primary block; and
        copy the association from the volatile memory to the non-volatile memory after verifying that the first data word was written correctly in the primary block.

2. The storage system of claim 1, wherein the controller is further configured to in response to a power cycle occurring prior to the association being copied to the non-volatile memory:
    read the logical address from the header of the second data word; and
    re-store, in the volatile memory, the association between the logical address and the physical address of the primary block.

3. The storage system of claim 1, wherein the controller is further configured to discard the second data word after verifying that the first data word was written correctly in the primary block.

4. The storage system of claim 1, wherein the controller is further configured to use an enhanced post-write-read (EPWR) operation to verify that the first data word was written correctly in the primary block.

5. The storage system of claim 1, wherein the controller is further configured to perform a low-density parity check (LDPC) operation using the parity bits.

6. The storage system of claim 1, wherein the primary and secondary blocks comprise single-level cell (SLC) blocks or multi-level cell (MLC) blocks.

7. The storage system of claim 6, wherein the controller is further configured to fold the data from the primary block to a multi-level cell (MLC) block.

8. The storage system of claim 1, wherein the non-volatile memory comprises a three-dimensional memory.

9. In a storage system comprising a non-volatile memory, a method comprising:
   creating a first data word comprising data and parity bits;
   creating a second data word comprising the data, a header storing logical group information for the data, and parity bits, wherein there are fewer parity bits in the second data word than the first data word due to the header in the second data word;
   writing the first data word in a primary block in the non-volatile memory;
   writing the second data word in a secondary block in the non-volatile memory; and
   verifying that the first data word was written correctly in the primary block; and
   writing addressing information in the non-volatile memory after verifying that the first data word was written correctly in the primary block.

10. The method of claim 9, wherein the first and second data words are a same size.

11. The method of claim 9, further comprising:
   in response to a power cycle occurring prior to writing the addressing information in the non-volatile memory, recreating the addressing information from the logical group information in the header of the second data word.

12. The method of claim 9, further comprising discarding the second data word after verifying that the first data word was written correctly in the primary block.

13. The method of claim 12, wherein the first data word is verified using an enhanced post-write-read (EPWR) operation.

14. The method of claim 9, further comprising performing a low-density parity check (LDPC) operation using the parity bits.

15. The method of claim 9, wherein the primary block comprises a single-level cell (SLC) block or a multi-level cell (MLC) block, and wherein the method further comprises folding the data from the primary block to a multi-level cell (MLC) block.

16. A storage system comprising:
   a volatile memory;
   a non-volatile memory;
   means for storing data in a first data word in a primary block in the non-volatile memory; and
   means for storing a copy of the data in a second data word in a secondary block in the non-volatile memory;
   wherein:
      the first and second data words are a same size but comprise a different number of parity bits;
      the second data word comprises a header storing a logical address of the data; and
      instead of comprising the header, the first data word comprises more parity bits than the second data word;
   means for storing, in the volatile memory, an association between the logical address of the data and a physical address of the primary block;
   means for verifying that the first data word was written correctly in the primary block; and
   means for copying the association from the volatile memory to the non-volatile memory after verifying that the first data word was written correctly in the primary block.

* * * * *